(12) United States Patent
Mizuhashi et al.

(10) Patent No.: US 7,548,276 B2
(45) Date of Patent: Jun. 16, 2009

(54) FRAME RATE CONVERSION DEVICE, IMAGE DISPLAY APPARATUS, AND METHOD OF CONVERTING FRAME RATE

(75) Inventors: Yoshiaki Mizuhashi, Yokohama (JP); Mitsuo Nakajima, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 604 days.

(21) Appl. No.: 11/190,191

(22) Filed: Jul. 27, 2005

(65) Prior Publication Data

US 2008/0007614 A1 Jan. 10, 2008

(30) Foreign Application Priority Data

Dec. 2, 2004 (JP) ............... 2004-349261

(51) Int. Cl.
*H04N 7/01* (2006.01)
(52) U.S. Cl. .................. 348/459; 348/443; 348/441; 348/452; 382/300; 375/240.16
(58) Field of Classification Search ........... 348/441, 348/443, 448, 451, 452, 459, 911, 236, 300; 375/240.16; 382/236, 300
See application file for complete search history.

(56) References Cited

U.S. PATENT DOCUMENTS

| | | | |
|---|---|---|---|
| 5,784,114 A | 7/1998 | Borer et al. | |
| 6,005,639 A | 12/1999 | Thomas et al. | |
| 6,111,610 A * | 8/2000 | Faroudja | 348/441 |
| 6,151,075 A * | 11/2000 | Shin et al. | 348/459 |
| 6,192,079 B1 * | 2/2001 | Sharma et al. | 375/240.16 |
| 6,229,570 B1 * | 5/2001 | Bugwadia et al. | 348/441 |
| 6,442,203 B1 | 8/2002 | Demos | |
| 6,542,198 B1 * | 4/2003 | Hung et al. | 348/459 |
| 6,900,846 B2 * | 5/2005 | Lee et al. | 348/459 |
| 7,193,655 B2 * | 3/2007 | Nicolas | 348/448 |

(Continued)

FOREIGN PATENT DOCUMENTS

JP 11-177940 A 2/1999

(Continued)

OTHER PUBLICATIONS

European Search Report issued in Patent Application No. 05253951.7-2223/1667093 dated on Sep. 18, 2006.

(Continued)

*Primary Examiner*—David L Ometz
*Assistant Examiner*—Jean W Désir
(74) *Attorney, Agent, or Firm*—McDermott Will & Emery LLP (57) ABSTRACT

The present invention provides a technique relating to a frame rate conversion which enables display of an image of extended definition by smoothening the movement of the image. Therefore, the invention fixes the direction of interpolation using information on a first frame which appeared before the insertion time of the interpolated frame, a second frame appeared before the first frame, a third frame appeared after the insertion time, and a fourth frame appeared after the third frame, based on the insertion time of the interpolated frame. The interpolated pixel is generated from pixels of the second frame and the third frame located in the direction of interpolation, and generates the interpolated frame. Then, the interpolated frame is inserted into the inputted image signal to convert the frame rate.

15 Claims, 6 Drawing Sheets

U.S. PATENT DOCUMENTS 7,236,207 B2 * 6/2007 Chen et al. .................. 348/459
7,295,245 B2 * 11/2007 Ha .............................. 348/452

FOREIGN PATENT DOCUMENTS

| JP | 11-112939 A | 4/1999 |
|---|---|---|
| JP | 11-261972 A | 9/1999 |
| JP | 11-298861 A | 10/1999 |
| JP | 2000-134585 A | 5/2000 |
| JP | 2001-24988 A | 1/2001 |
| JP | 2001-025021 | 1/2001 |
| JP | 2001-111968 A | 4/2001 |
| JP | 2003-333540 A | 11/2003 |
| JP | 2004-320278 | 11/2004 |

OTHER PUBLICATIONS

Japanese Office Action Issued in Japanese Patent Application No. JP 2004-349261 dated Mar. 3, 2009.

* cited by examiner

FRAME RATE CONVERSION DEVICE, IMAGE DISPLAY APPARATUS, AND METHOD OF CONVERTING FRAME RATE

BACKGROUND OF THE INVENTION

1. Field of the Invention

The present invention relates to a frame rate converting technique for converting the number of image frames used, for example, for an image display apparatus.

2. Description of the Related Art

In the image display apparatus, as a technique for displaying a moving image after having converted a frame rate (frame frequency) of image signal transmitted through a television broadcast into a desired frame rate, for example, a technique described in JP-A-2001-111968 is known.

In the related art described above, when increasing the frame rate of the image signal as a conversion process, a process to repeat the same frame a plurality of times is performed. For example, when doubling the frame rate of an image signal having a frame row of (F1, F2 . . . ), a process to repeat each frame two times each, such as (F1, F1, F2, F2 . . . ) is performed. Therefore, in the image signal after conversion, the position of an object which moves within the display is the same between the repeated two frames. Therefore, in the related art, it is difficult to achieve smooth movement of the moving image after the frame rate conversion.

The above described problem is obvious when a 2-3 pull-downed interlace image signal is displayed by 60 frames per second. The 2-3 pulldown system image signal is converted into the image signal of 24 frames per second once by reverse pulldown process in the image display apparatus, and then is converted into an image signal of 60 frames per second by repeating the same frame image in the order of two frames, three frames, two frames, three frames . . . . Therefore, since the image after conversion is switched in its image contents every ⅖₀, ⅗₀ seconds, even when it is an image in which an object moves in the screen at a constant velocity, the amount of movement of the object per unit time is no longer constant after conversion. Also, since the time period in which the same frame is displayed is increased, achievement of smooth movement is further difficult.

SUMMARY OF THE INVENTION

In view of such a problem described above, it is an object of the invention to provide a technology relating to frame rate conversion which makes the movement of image smoother and enables display of extended definition image.

The invention is characterized in that when the frame rate is converted by inserting an interpolated frame in the image signal, the interpolated frame is generated by using information on at least three frames of the image signal. The three frames are previous and subsequent frames interposing a position where the interpolated frame is inserted and a frame adjacent to any one of the previous and subsequent frames. The interpolated frame preferably uses information on four frames. The four frames include a first frame which appeared before the insertion time of the interpolated frame, a second frame appeared before the first frame, a third frame appeared after the insertion time, and a fourth frame appeared after the third frame.

Specifically, the frame rate conversion according to the invention includes the steps of: setting a plurality of straight lines passing through the first to fourth frames based on a certain interpolated pixel in the interpolated frame, and obtaining, for each of the plurality of the straight lines, a sum of the difference between the pixel on the first frame and the pixel on the second frame located on each of the plurality of straight line, the difference between the pixel on the second frame and the pixel on the third frame located on the straight line, the difference between the pixel on the third frame and the pixel on the fourth frame on the straight line. The sum value is used as information for generating the interpolated frame, that is, as information on movement of the image. Then, the straight line whereof the sum value of the difference is the smallest is determined as a reference of the direction in which the movement of image, that is, the direction of interpolation for generating the aforementioned certain interpolated pixel, and the interpolated pixel is generated using the pixel information on the first frame and the third frame located in the direction of interpolation (that is, the previous and subsequent frames adjacent to the interpolated frame). The direction of interpolation may be the direction of the straight line whereof the sum of the differences is the smallest, or may be determined by using this straight line and the direction of interpolation of at least one interpolated pixel generated before the aforementioned certain interpolated pixel and/or one or more directions of interpolation of the interpolated frame generated before the interpolated frame in question.

As described above, according to the invention, the movement of the image after converting the frame rate is smoothened, and hence an extended definition image can be obtained.

DETAILED DESCRIPTION OF THE PREFERRED EMBODIMENTS

Referring now to the drawings, preferred embodiment for carrying out the invention will be described.

First Embodiment

Figure 1:
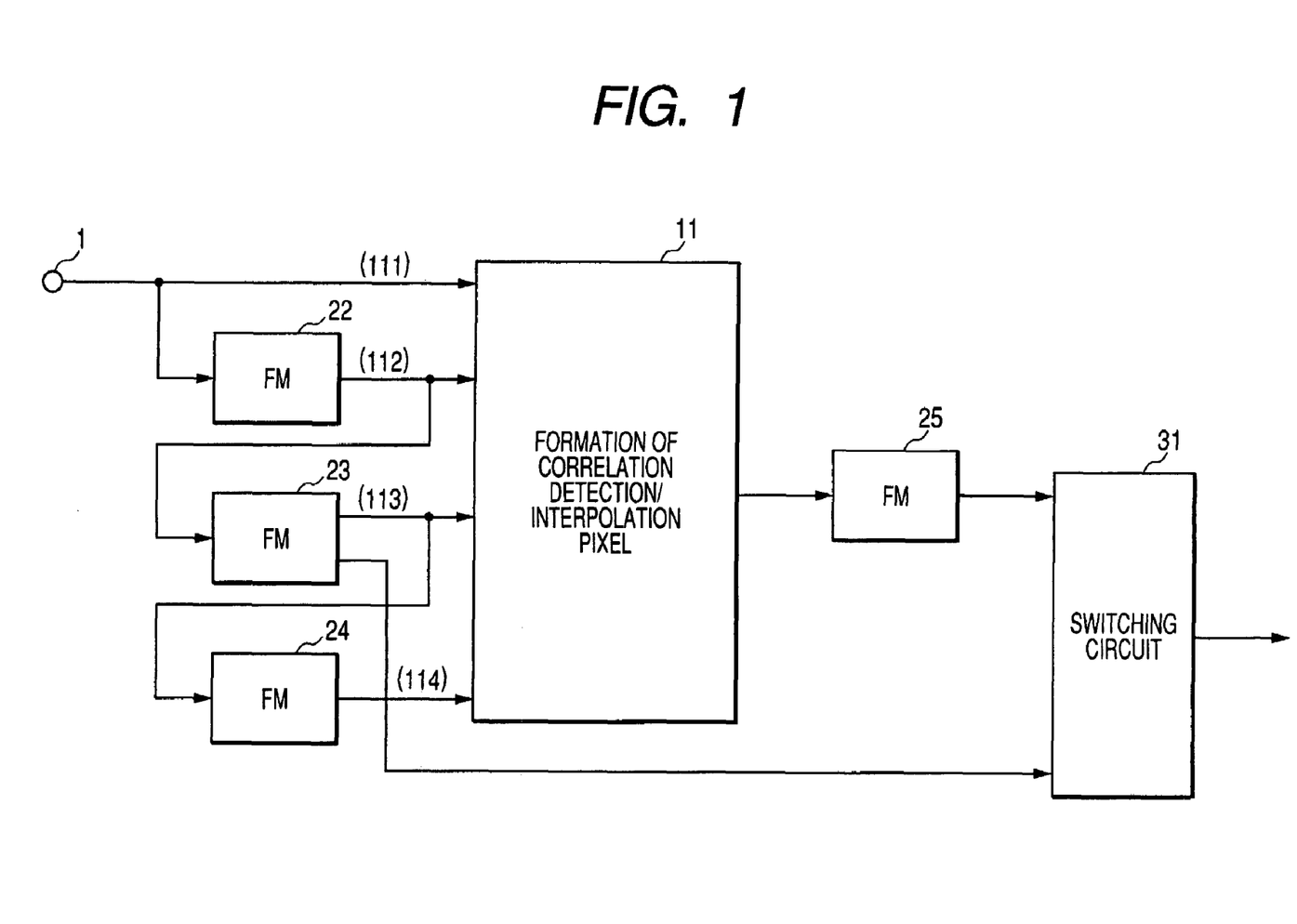
FIG. 1 is a drawing showing a circuit block in a first embodiment of the invention.
Figure 2:
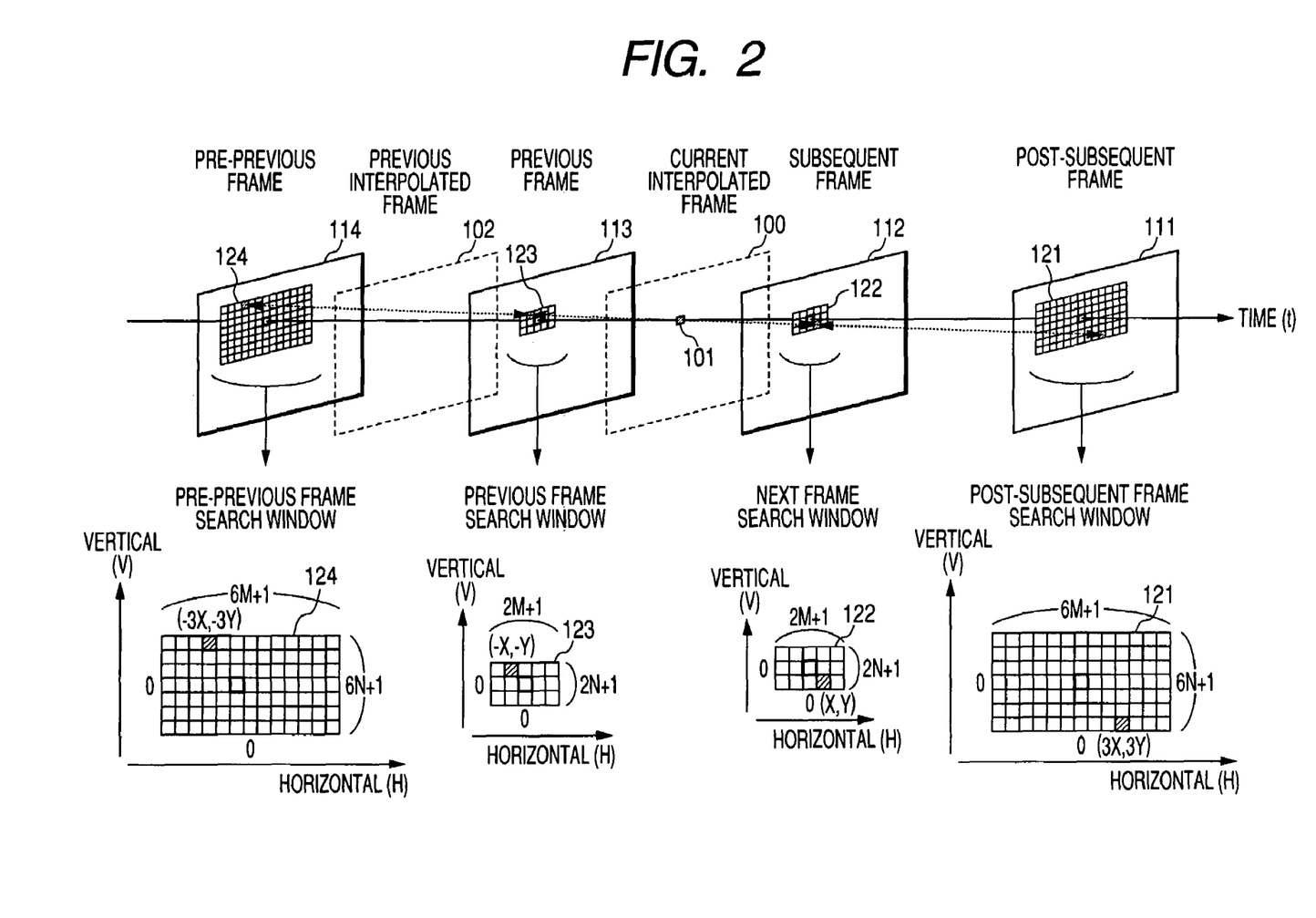
FIG. 2 is an explanatory drawing showing a process of a correlation detection/interpolated pixel generation unit in the first embodiment.

Referring now to FIG. 1 and FIG. 2, the first embodiment of the invention will be described. FIG. 1 is a block diagram showing the first embodiment of a frame rate conversion unit used in an image display apparatus. In the first embodiment, a case in which an image signal of sequential scanning system of 60 frames per second is inputted, and the frame rate of this image signal is converted into the image signal of double frames, that is, of 120 frames per second will be described as an example. As a matter of course, the frame frequency of the aforementioned inputted image signal may be other frequencies. Needless to say that this embodiment can be applied to the case in which the frame rate is converted in a multiplying factor different from twice (for example, the frequency of 1.5 times or three times) in the same manner. In the following description, it is assumed that the inputted image signal has a digital format. Therefore, when the image display apparatus received an analogue image signal, the analogue image signal is converted into a digital image signal and supplied to a circuit shown in FIG. 1.

The frame rate conversion unit according to this embodiment includes frame memories 22-24 and 25, a correlation detection/interpolated pixel generation unit 11 and a switching circuit 31. An image signal inputted to an input terminal 1 of the image signal is supplied to the correlation detection/interpolated pixel generation unit 11 and the frame memory 22. The frame memory 22 delays the image signal by one frame by retaining the image signal for a time period corresponding to one frame. The signal delayed by one frame is supplied to the correlation detection/interpolated pixel generation unit 11 and the frame memory 23. The frame memory 23 delays the image signal by another one frame by retaining the image signal for the time period corresponding to one frame like the frame memory 22. Therefore, the output signal of the frame memory 23 is delayed by two frames with respect to the image signal at the signal input terminal 1. The image signal delayed by two frames is supplied to the correlation detection/interpolated pixel generation unit 11, the frame memory 24, and the switching circuit 31. The frame memory 24 delays the image signal by one frame as in the case of the frame memories 22 and 23 by retaining the image signal for a time period corresponding to one frame. Therefore, the output signal of the frame memory 23 is delayed by three frames with respect to the image signal at the signal input terminal 1. The signal delayed by three frames is also supplied to the correlation detection/interpolated pixel generation unit 11.

When the image signal corresponding to four frames in the signal input terminal 1 and the frame memories 22-23 is inputted to the correlation detection/interpolated pixel generation unit 11, the correlation detection/interpolated pixel generation unit 11 generates the interpolated frame using upon reception thereof. In this first embodiment, the interpolated frame is inserted temporally between the signal delayed by one frame by the frame memory 22 and the signal delayed by two frames by the frame memory 23. Therefore, since the signal delayed by two frames by the frame memory 23 exists temporally before the interpolated frame, this is referred to as a previous frame 113. Since the signal delayed by three frames by the frame memory 24 exists temporally before the previous frame 113, that is, two frames before the interpolated frame, this is referred to as a pre-previous frame 114. On the other hand, since the signal delayed by one frame by the frame memory 22 exists temporally after the interpolated frame, this is referred to as a subsequent frame 112. Since the signal from the signal input terminal 1, which is not delayed, exists temporally after the subsequent frame 112, that is, two frames after the interpolated frame, this is referred to as a post-subsequent frame 111. The aforementioned four frames of the post-subsequent frame 111, the subsequent frame 112, the previous frame 113, the pre-previous frame 114 are consecutive frames.

The correlation detection/interpolated pixel generation unit 11 detects a direction having stronger correlation about a certain interpolated pixel (a pixel to be interpolated) in an interpolated frame to be generated, that is, the direction of movement of the interpolated pixel in question, from four frames of the aforementioned post-subsequent frame 111, the subsequent frame 112, the previous frame 113, and the pre-previous frame 114. Then, the interpolated pixel is generated using data of the pixels in the previous frame 113 and the subsequent frame 112 located in this direction of movement. Detection of the direction of movement and generation of the interpolated pixel is performed for all the pixels in one interpolated frame. For example, when the number of pixels in one frame is 640×480, detection of the direction of movement and generation of the interpolated pixel are performed by the number of times corresponding to the number of the pixels, and consequently, one interpolated frame is generated.

The interpolated frame generated in the correlation detection/interpolated pixel generation unit 11 in this manner is supplied to the frame memory 25. The frame memory 25 retains the interpolated frame obtained from the correlation detection/interpolated pixel generation unit 11 for the time period corresponding to one frame, and supplies the same to the switching circuit 31. The switching circuit 31 switches the interpolated frame from the frame memory 25 and the previous frame 113 from the frame memory 23 in cycle of $\frac{1}{120}$ second. Accordingly, the interpolated frame is inserted between the adjacent two frames of the input image signal, and the input image signal is converted in frame rate to a doubled frame frequency, that is, to an image signal having a frame frequency of 120 Hz (that is, converted to a doubled speed). The image signal converted in frame rate from the switching circuit 31 is supplied to a display panel, not shown, and the image converted in frame rate is displayed. It is assumed that the display panel is a flat-type display device such as a plasma display panel (PDP), a liquid crystal panel or a field emission display (FED). However, in this embodiment, a non-panel type display device such as a CRT may be employed instead of the display panel. Subsequently, referring to FIG. 2, detection of correlation (direction of movement) in the aforementioned correlation detection/interpolated pixel generation unit 11 and generation of interpolated pixel will be described in detail. As shown in FIG. 2, the correlation detection/interpolated pixel generation unit 11 sets a next correlation search window for a certain interpolated pixel 101 on an interpolated frame 100. For the previous frame image 113 and the subsequent frame image 112, search windows 123, 122 each having a range of laterally 2M+1 pixels and vertically 2N+1 pixels (M and N represent natural numbers) respectively on the basis of the position of the interpolated pixel 101 in the frame. In this case, it is assumed that M=2 and N=1. For the pre-previous frame image 114 and the post-subsequent frame image 111, search windows 124, 121 each having a range of laterally 6M+1 pixels and vertically 6N+1 pixels are set on the basis of the position of the interpolated pixel 101 in the frame, respectively. On these search windows, the position of the interpolated pixel is determined to be (0, 0). Then, on the basis of the interpolated pixel, a plurality of straight lines passing the interpolated pixel and passing through the post-subsequent frame 111, the subsequent frame 112, the previous frame 113, and the pre-previous frame 114 are set. In this embodiment, fifteen straight lines described below are set as the plurality of the straight lines. In the following description, numerals before parentheses represent reference numerals of the respective search windows, and numerals in parentheses represent a coordinate (X, Y) on the search window. In other words, the respective straight lines shown below are straight lines passing through the respective pixels located at the respective coordinates. All of the respective straight lines pass through the interpolated pixel 101.

(a) 124 (−6, 3)–123 (−2, 1)–122 (2, −1)–121 (6, −3)
(b) 124 (−3, 3)–123 (−1, 1)–122 (1, −1)–121 (3, −3)
(c) 124 (0, 3)–123 (0, 1)–122 (0, −1)–121 (0, −3)
(d) 124 (3, 3)–123 (1, 1)–122 (−1, −1)–121 (−3, −3)
(e) 124 (6, 3)–123 (2, 1)–122 (−2, −1)–121 (−6, −3)

(f) 124 (−6, 0)–123 (−2, 0)–122 (2, 0)–121 (6, 0)
(g) 124 (−3, 0)–123 (−1, 0)–122 (1, 0)–121 (3, 0)
(h) 124 (0, 0)–123 (0, 0)–122 (0, 0)–121 (0, 0)
(i) 124 (3, 0)–123 (1, 0)–122 (−1, 0)–121 (−3, 0)
(j) 124 (6, 0)–123 (2, 0)–122 (−2, 0)–121 (−6, 0)
(k) 124 (−6, −3)–123 (−2, −1)–122 (2, 1)–121 (6, 3)
(l) 124 (−3, −3)–123 (−1–1)–122 (1, 1)–121 (3, 3)
(m) 124 (0, −3)–123 (0, −1)–122 (0, 1)–121 (0, 3)
(n) 124 (3, −3)–123 (1, −1)–122 (−1, 1)–121 (−3, 3)
(o) 124 (6, −3)–123 (2, −1)–122 (−2, 1)–121 (−6, 3)

Then, for each of the aforementioned fifteen straight lines shown above in (a) to (o), the following parameters relating to the correlation with respect to the interpolated pixel 101 are calculated and obtained. (1) an absolute value of the difference between a pixel at a coordinate (X, Y) in the subsequent frame search window 122 and a pixel at a coordinate (−X, −Y) in the previous frame search window 123; (2) an absolute value of the difference between a pixel at a coordinate (−X, −Y) in the previous frame search window 123 and a pixel at a coordinate (−3X, −3Y) in the pre-previous frame search window 124; (3) an absolute value of the difference between a pixel at a coordinate (X, Y) in the subsequent frame search window 122 and a pixel at a coordinate (3X, 3Y) in the post-subsequent frame search window 121.

For example, in the case of the straight line (a), an absolute value of the difference between a pixel at a coordinate (2, −1) on the search window 122 and a pixel at a coordinate (−2, 1) on the search window 123, an absolute value of the difference between a pixel at a coordinate (−2, 1) on the search window 123 and a pixel at a coordinate (−6, 3) on the search window 124, and an absolute value of the difference between a pixel at a coordinate (2, −1) on the search window 122 and a pixel at a coordinate (6, −3) on the search window 121 are obtained. The reason why the coordinate in the previous frame search window 123 is represented by (−X, −Y) is to indicate that when the coordinate in the subsequent frame search window 122 is assumed to be (X, Y), the coordinate on the search window 123 is located in the opposite direction from the coordinate on the search window 122 both in the X-direction and Y-direction. The reason why the coordinate on the pre-previous frame search window 124 is represented by (−3X, −3Y) is to indicate that when the coordinate on the post-subsequent frame search window 122 is assumed to be (X, Y), the coordinate on the search window 124 is triple of the coordinate on the search window 122 both in the X-direction and Y-direction.

The correlation detection/interpolated pixel generation unit 11 scans X from −M to M and Y from −N to N in the subsequent frame search window 122, respectively. Accordingly, calculation shown in (1) to (3) is performed for each of the aforementioned fifteen straight lines, and the sum of the absolute value of the respective difference obtained by the calculation (1) to (3) is calculated for each straight line. It is determined that the smaller the sum value is, the stronger the correlation is in that direction. In other words, it is determined to be the direction of movement. In this embodiment, the straight line whereof the sum of (1) to (3) is the smallest is determined to be the direction of movement of an object. In this case, a straight line passing through a pixel shown in gray color in FIG. 2, that is, the straight line (b) is the straight line whereof the sum value is the smallest. In other words, the direction indicated by the straight line (b) is the direction of movement of the object passing through the interpolated pixel 101. The correlation detection/interpolated pixel generation unit 11 generates the interpolated pixel 101 using a pixel on the subsequent frame 112 located on the straight line (b) whereof the aforementioned sum value is the smallest and a pixel on the previous frame 113. In other words, the correlation detection/interpolated pixel generation unit 11 determines the straight line (b) as the direction of interpolation for generating the interpolated pixel 101, and uses the pixels on the previous frame and the subsequent frame located in the direction of interpolation as data for generating the interpolated pixel 101 as a pixel set having the strongest correlation with respect to the interpolated pixel 101. In this case, since the direction of interpolation is the direction of the straight line (b), the interpolated pixel 101 is generated by using a pixel at a coordinate (−1, 1) on the previous frame located on the straight line (b) (the gray pixel in the search window 123) and a pixel at a coordinate (1, −1) on the subsequent frame (a gray pixel in the search window 122). Here, the interpolated pixel 101 can be obtained, for example, by a following expression.

$$\gamma = (\alpha + \beta)/2 \qquad \text{(Expression 1)}$$

where $\alpha$ represents a pixel data (level) in the previous frame, $\beta$ represents a pixel data in the subsequent frame, and $\gamma$ represents data of the interpolated pixel 101.

In other words, the interpolated pixel 101 is generated by calculating an average (intermediate value) between the pixel data in the previous frame and the pixel data in the subsequent frame.

By performing detection of the direction of movement and generation of the interpolated pixel entirely for the current interpolated frame 100, a single piece of the interpolated frame 100 is generated. In other words, such a process is performed by the number of times corresponding to the number of pixels which constitutes the frame. The generated interpolated frame 100 is written in the frame memory 25 as described above, and is inserted between two frames of the inputted image signal by the switching circuit 31. Accordingly, conversion of the frame rate is effected, and finally, an image signal having a frame frequency of 120 Hz is generated. The image signal having the frame rate of 120 Hz is particularly effective for the display device using the liquid crystal panel as the display panel. In other words, although the liquid crystal panel has a tendency to bring down an afterimage, by converting the frame rate of the image signal into 120 Hz, the after image can be put into the shade. In this embodiment, the frame rate is converted by switching the output of the frame memory 23, that is, the previous frame 113 and the interpolated frame 100 by the switching circuit 31. However, it is also possible to convert the frame rate by switching the subsequent frame 112 and the interpolated frame.

In this embodiment, the values of M and N employed for determining the size of the search window are M=2 and N=1. However, these values are arbitrary, and may be defined according to the effect of interpolation, the amount of calculation, or the scale of the circuit. For example, when M=7 and N=3 are employed, a hundred-and-five straight lines are set. Although the straight line whereof the sum of the aforementioned differences is the smallest is determined as the direction of interpolation in this embodiment, it is not limited thereto. For example, it is also possible to determine the direction of interpolation finally by combining other conditions based on the straight line whereof the aforementioned sum value is the minimum. As methods of determination of the direction of interpolation, examples will be shown below.

First Method: Points are provided for the respective straight lines from (a) to (o) based on the sum values calculated for the respective fifteen straight lines passing through the interpolated pixel 101. The smaller the sum value, the larger points are provided. Then, the directions of interpolation of the plurality of other interpolated pixels which are already generated before the interpolated pixel 101 are used for final determination of the direction of interpolation. The plurality of other interpolated pixels are preferably those adjacent to the interpolated pixel 101. To which one of the aforementioned straight lines from (a) to (o) the directions of interpolation of those other interpolated pixels correspond is determined, and a predetermined point is added to the corresponding straight line. As a result of this addition, the straight line having the highest point is fixed to be the direction of interpolation. For example, it is assumed that 15 points, 14 points, 13 points, 12 points, and 11 points are added to the straight lines (b), (c), (f), (b), and (e), respectively according to the aforementioned sum value (here, for the sake of simplification of description, only five straight lines from the top are exemplified). If the direction of interpolation of the interpolated pixel at the immediate left of the interpolated pixel 101 is (c), the direction of interpolation of the interpolated pixel at the upper left thereof is (c), the direction of interpolation of the interpolated pixel immediately above is (a), and the direction of interpolation of the interpolated pixel at the upper right thereof is (b), for example, 5 points each is added to the straight lines (a), (b) and (c). Consequently, since the straight line (c) has 24 points, which are the highest points, the direction of the straight line (c) is fixed to be the direction of interpolation. Although the number of the aforementioned other interpolated pixels are four in the description, it may be one, or two, or three. When there is only one, only the interpolated pixel at the immediate left is used, and when there are two, the interpolated pixels at the immediate left and immediately above are used.

Second Method: Addition of the points to the respective straight lines is the same as the first method. The directions of interpolation used for the interpolated frame, which is already generated before the interpolated pixel 101 by one frame, are counted for each sort. Then, the predetermined points are added to the straight lines corresponding to the top three directions in terms of the enumerated value. As a matter of course, the larger the enumerated value, the higher point is added. As a result of addition, the direction of the highest point is fixed to be the direction of interpolation. For example, it is assumed that the points of the respective straight lines based on the aforementioned sum values are the same as the first method, and the descending order of the enumerated values of the directions of interpolation used for the previous interpolated frame are the straight line (f), the straight line (c) and the straight line (a). In this case, 5 points, 3 points and 1 point are added to the straight lines (f), (c) and (a) respectively. Consequently, since the point of the straight line (f) is 18 points, which is the highest, the direction of the straight line (f) is fixed to be the direction of interpolation.

The first and second methods may be used independently, or may be used in combination thereof. Which method to be used is determined by the requirement relating to improvement of accuracy of decision of the direction of interpolation.

In this manner, in this embodiment, the direction of interpolation is fixed based on the movement of the moving image, and the interpolated frame is generated by interpolated pixels based on the direction of interpolation instead of simply inserting the same frame in the image signal as the previous frame as the interpolated frame as in the related art. Therefore, the movement of the moving image after conversion of the frame rate can be smoothened. In this embodiment, four frames are used when detecting the direction of movement. Therefore, the direction of movement can be detected with higher degree of accuracy in comparison with the case of detecting the same from two frames. Although the four frames of the previous frame, the subsequent frame, the pre-previous frame, and the post-subsequent frame are used for detecting the movement in this embodiment, it may be detected using three frames. At this time, as the three frames used for detecting the direction of movement, one of the pre-previous frame or the post-subsequent frame is used in addition to the previous frame and the subsequent frame. In other words, the detection accuracy of the direction of movement can be improved by using at least three frames. Although it is preferable to use four frames as this embodiment in order to further improve accuracy of detection of movement, when it is difficult to use many frame memories by being bound by the scale of the circuit or the cost, it is possible to use three frames. In this case as well, the invention is implemented as described above. In this case, one of the post-subsequent frame search window 121 or the pre-previous frame search window 124 is deleted as the search window used for detecting the movement.

Second Embodiment

Referring now to FIG. 3 to FIG. 6, a second embodiment of the invention will be described. This embodiment is described about the case in which the 2-3 pulldowned interlace signal of 60 fields per second (hereinafter referred simply as "2-3 signal") is inputted, and this signal is converted into a moving image of 60 frames per second as an example.

Figure 3:
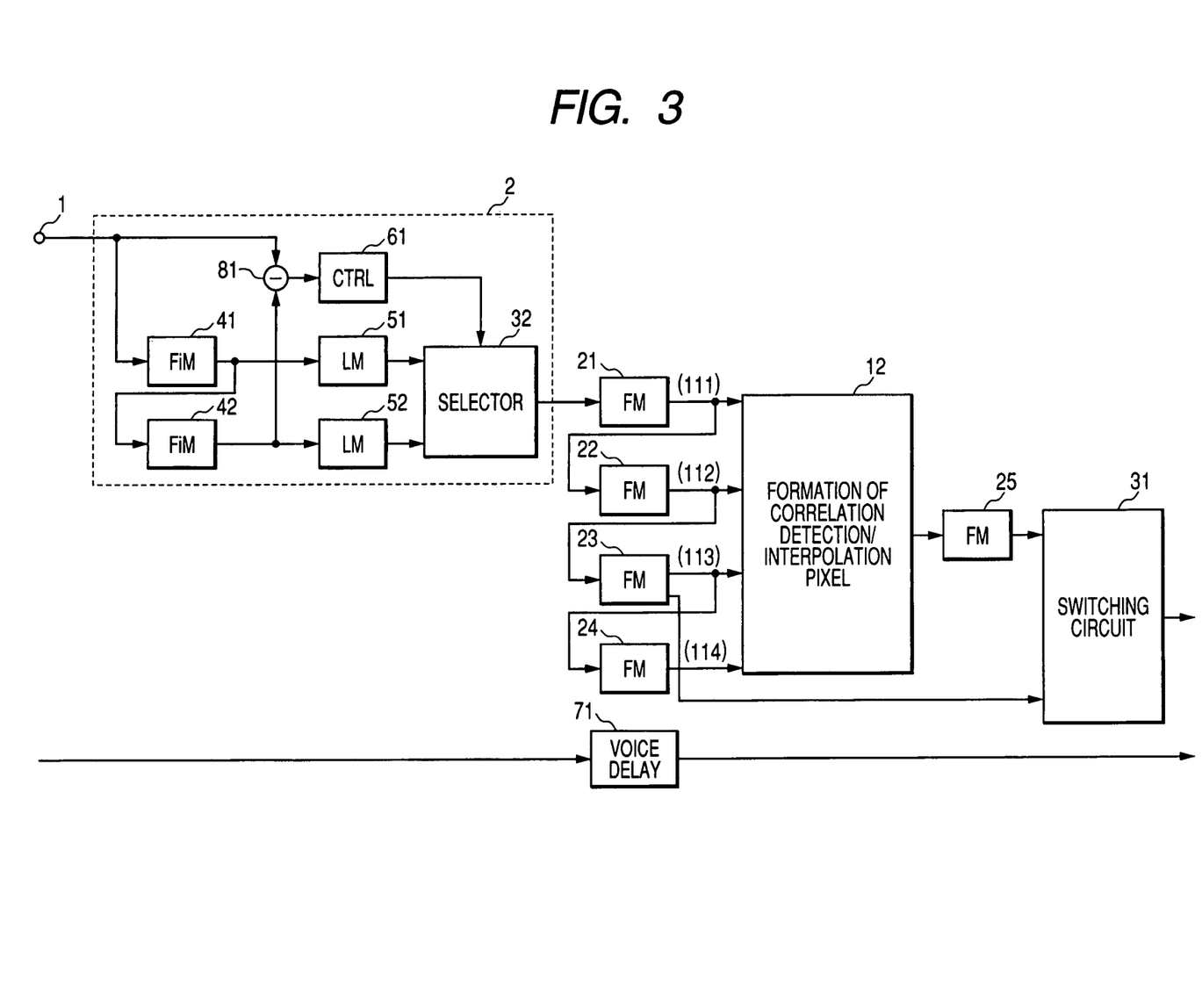
FIG. 3 is a drawing showing a circuit block in a second embodiment of the invention.

FIG. 3 is a circuit block diagram showing the second embodiment of the invention. A point significantly different from the first embodiment shown in FIG. 1 is that a sequential scanning conversion unit 2 is added. This sequential scanning conversion unit includes field memories 41 and 42, a subtracter 81, a controller 61, line memories 51 and 52, and a selector 32. The image signal (2-3 signals) inputted from the signal input terminal 1 is supplied to the field memory 41 and the subtracter 81. The field memory 41 retains and delays the inputted image signal by one field and outputs the same to the field memory 42 and the line memory 51. The field memory 42 retains the output signal from the field memory 41 to delay the same by another one field, and then outputs the same to the line memory 52 and the subtracter 81. Therefore, the output from the field memory 42 is delayed by two fields (one frame) with respect to the inputted image signal. The line memories 51 and 52 retains the image signals outputted from the field memories 41 and 42 respectively for the time period corresponding to one line, and outputs the same to the selector 32.

Figure 4:
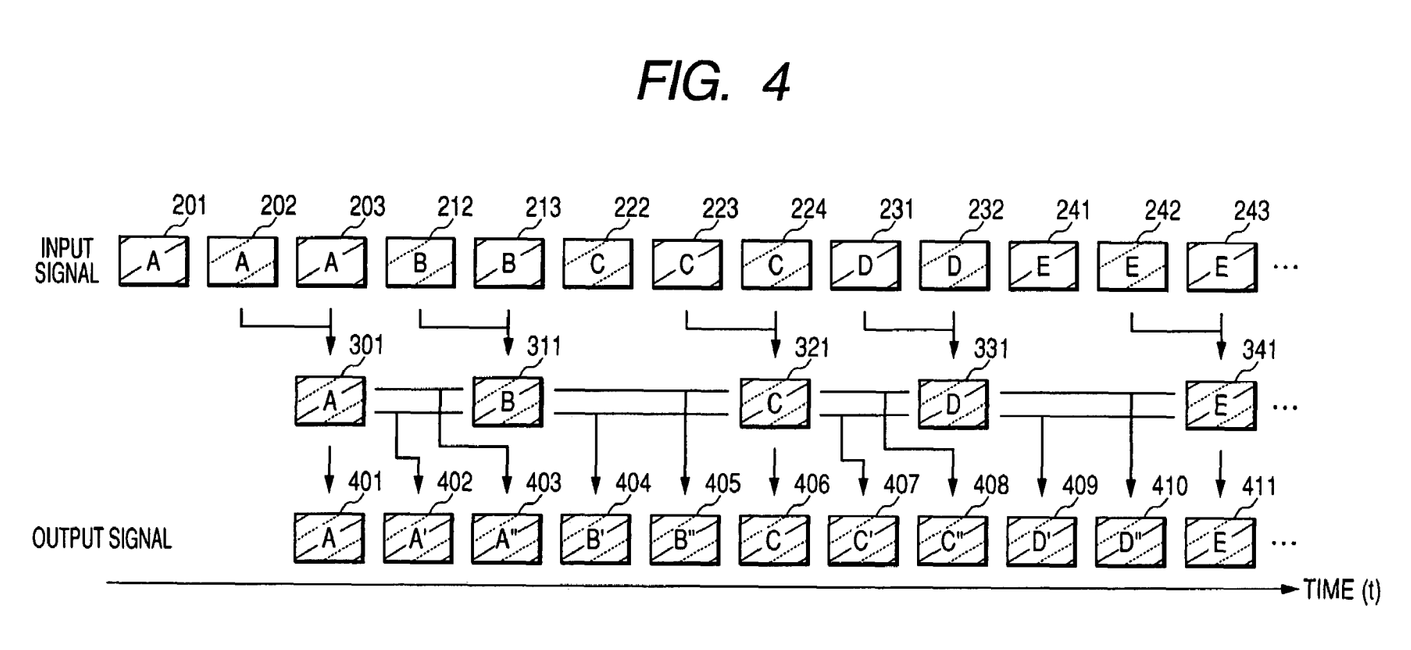
FIG. 4 is an explanatory drawing showing a process of a correlation detection/interpolated pixel generation unit in the second embodiment.

On the other hand, the subtracter 81 subtracts the image signal inputted to the signal input terminal 1 and the image signal delayed by two fields and outputted from the field memory 42, and outputs the result of subtraction to the controller 61. As indicated by "input signal" in FIG. 4, images 201-243 of the 2-3 signal are of an interlace image signal of 60 fields per second, and odd numbers represent an image signal of the top field and even numbers represent an image signal of the bottom field. The images having the same number in tenth digit indicates that they are the image signals generated from the same original 24 frames per second. Therefore, the images 201 and 203 are the same. In the same manner, the images 222 and 224, the images 241, 243 are the same, respectively. In this manner, in the 2-3 signal, the image contents in two fields with the intermediary of one field are the same with a period of five fields. Therefore, the difference between the inputted image signal and the image signal delayed by two fields (frame difference) becomes substantially zero once at every five fields. The aforementioned controller 61 detects that the inputted image signal is 2-3 signal when the sequence in which the difference becomes zero once at every five fields (a series of flow in which the difference appears in the sequence of present-present-present-absent (zero)-present) appears consecutively at least by a predetermined number of times (for example, 3 times). When the inputted image signal is determined to be 2-3 signal, the controller 61 outputs the control signal with respect to the selector 32. The control signal controls the selector 32 so as to output the signal from the line memory 51 and the signal from the line memory 52 alternately by switching between them periodically. Therefore, from the selector 32, the first line of the first field stored in the field memory 41, the first line of the second field stored in the field memory 42, the second line of the first field, and the second line of the second field are outputted in this order. Consequently, the sequential scanning-signal (signal one frame) as shown in the middle stage in FIG. 4 is generated from the two fields of the 2-3 signal. For example, as shown in FIG. 4, an image 301 is generated when the images 203 and 202 are retained in the field memory 41 and 42 respectively, and an image 311 is generated when the images 212, 213 are retained respectively. The control signal from the controller 61 to the selector 32 is outputted at such timing as to generate two frames from five fields of the 2-3 signal. In this manner, the sequential scanning conversion unit 2 performs the process of converting the 2-3 pulldowned interlace signal of 60 fields per second into a non-interlace (sequentially scanning) signal of 24 frames per second.

The non-interlace signal of 24 frames per second outputted from the sequential scanning conversion unit 2 is supplied to the frame memory 21. Unlike with the first embodiment, the frame memory 21 is newly added in the second embodiment. The reason will be described referring to FIG. 4. The first embodiment is a process for converting the number of frames of the image signal into double. However, since this embodiment is a process for converting the image of 24 frames per second to the image of 60 frames per second, two types of images must be generated from the images of the same combination. For example, it is necessary to generate two types of images, that is, an image 404 and an image 405 between the image 311 and the image 321 from four frames of the image 301, the image 311, the image 321, and the image 331 in FIG. 4. Therefore, there is a necessity to perform processing twice in a correlation detection/interpolated pixel generation unit 12. In the first embodiment, the processing is performed only once, and hence the signal inputted from the outside can be used as is. However, in this embodiment, it is necessary to use the signal from the selector 32 twice. Therefore, in this embodiment, the frame memory 21 is newly added, and the signal from the selector 32 is written and read out twice in this frame memory 21.

Subsequently, referring also to FIG. 5, the interpolation process for generating, for example, the image 405 in FIG. 4 will be described in detail. The frame memories 21-24 in FIG. 3 are frame memories which are similar to those in the first embodiment, and retain the image for the time period corresponding to one frame. The frame memory 21 retains the signal from the selector 32 for the time period corresponding to one frame, and outputs the image data 331 which corresponds temporally to the post-subsequent frame 111 with respect to the interpolated frame 100 to the correlation detection/interpolated pixel generation unit 12. The frame memories 22, 23 and 24 retain data corresponding to one frame as in the first embodiment, and output the image 321, which is the subsequent frame 112, the image 311 which is the previous frame 113, and the image 301 which is the pre-previous frame 114. The correlation detection/interpolated pixel generation unit 12 performs detection of the direction of interpolation and generation of interpolated pixel and the interpolated frame using four frames data outputted from the frame memories 21-24 as in the first embodiment. However, unlike with the first embodiment, in this embodiment, the temporal distance between the interpolated frame 100 to be generated and the previous frame 113, and the temporal distance between the interpolated frame 100 and the subsequent frame 112 are different from each other. For example, when generating the image 405 in FIG. 4, the ratio of the temporal distance of the image 311 which is the previous frame 113 and the image 321 which is the subsequent frame 112 with respect to the image 405 is 3:2. Accordingly, the rate of the temporal distance of the pixels which correlates to the interpolated pixel 101 must also be 3:2, and hence the size of the search window must be changed correspondingly. Therefore, in this embodiment, the following parameters relating to the correlation with the interpolated pixel 101 are obtained for each of the plurality of the straight lines passing through the aforementioned four frames on the basis of the interpolated pixel 101. (1) an absolute value of the difference between the pixel at the coordinate (X, Y) on the subsequent frame search window 122 and the pixel at the coordinate (−1.5X, −1.5Y) on the previous frame search window 123; (2) an absolute value of the difference between the pixel at the coordinate (−1.5X, −1.5Y) on the previous frame search window 123 and the pixel at the coordinate (−4X, −4Y) on the pre-previous frame search window 124; (3) an absolute value of the difference between the pixel at the coordinate (X, Y) on the subsequent frame search window 122 and the pixel at the coordinate (3.5X, 3.5Y) on the post-subsequent frame search window 121.

When the position of the pixel does not become an integer number and hence is a position where the actual pixel does not exist, a weighted mean of the peripheral pixels is used as the pixel value of that position. For example, when the gray position on the previous frame search window 123 shown in FIG. 5 is the position of the pixel, this position of the pixel is located at the center of peripheral four pixels, and hence data of the position of this pixel is obtained by dividing the sum of the four pixel data on the periphery thereof by four. Then, the direction of interpolation of the interpolated pixel 101 is fixed from the straight line whereof the sum of the aforementioned (1) to (3) is the smallest, or based on that straight line in the same process as described in conjunction with the first embodiment. Then, the pixel on the previous frame 113 and the pixel on the subsequent frame 112 located in this direction of interpolation are used to generate the interpolated pixel 101. Here, since the temporal distance between the interpolated frame 100 and the previous frame 113 and the temporal distance between the interpolated frame 100 and the subsequent frame 112 are different, the weighted mean of the two pixels located in the direction of interpolation is obtained according to the ratio of those temporal distances. In this embodiment, since the ratio of the temporal distances is 3:2, the interpolated pixel 101 can be obtained, for example by the following expression $$\gamma = (2\alpha + 3\beta)/5 \qquad \text{(Expression 2)}$$

where $\alpha$ represents the pixel data of the previous frame, $\beta$ represents the pixel data of the subsequent frame, and $\gamma$ represents data of the interpolated pixel 101.

Since the pixel used for interpolation, the pixel data $\alpha$, and the pixel data $\beta$ have strong correlation, these values are in the similar level. Therefore, it is also possible to obtain data of the interpolated pixel $\gamma$ from the average between the pixel data $\alpha$ and the pixel data β (for example, from calculation using Expression 1) for reducing the amount of calculation or the scale of the circuit.

Figure 5:
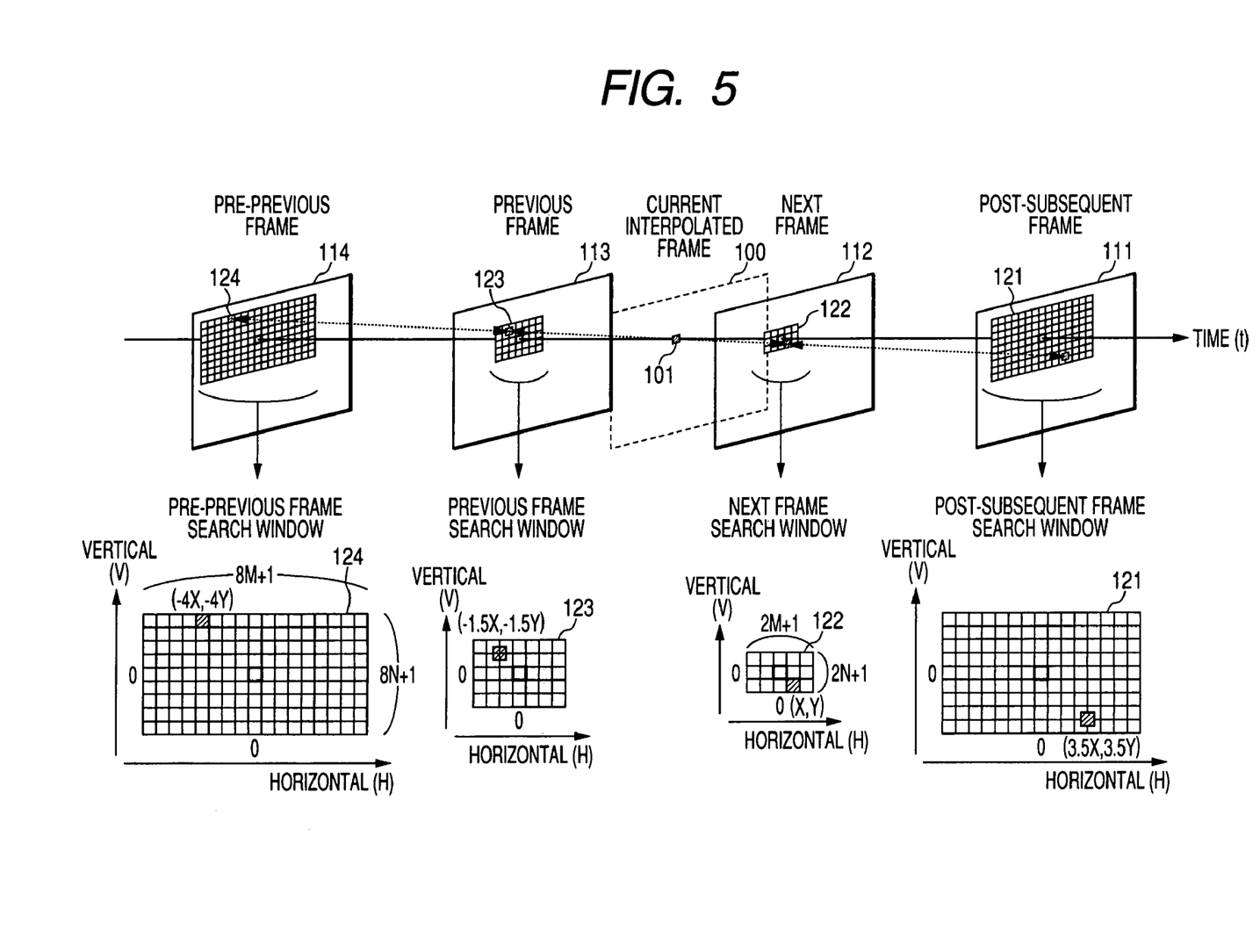
FIG. 5 is an explanatory drawing showing a process of the correlation detection/interpolated pixel generation unit in the second embodiment.

Although the ratio between the temporal distance between the image 311, which is the previous frame 113, and the image 405, and the temporal distance between the image 321, which is the subsequent frame 112 and the image 405 is 3:2 in FIG. 5, the ratio may change according to the temporal position of the image to be interpolated. In this embodiment, the case in which the 2-3 signal is converted into the signal of 60 frames per second has been described as an example. However, the same processing is performed also when it is converted into 72, 96 or 120 frames per second. In this case, although the ratio of the temporal distance changes, the same processing is performed except for the points that the image signal is read from the frame memories 21-24 and the number of times of generating the interpolated image changes.

Figure 6:
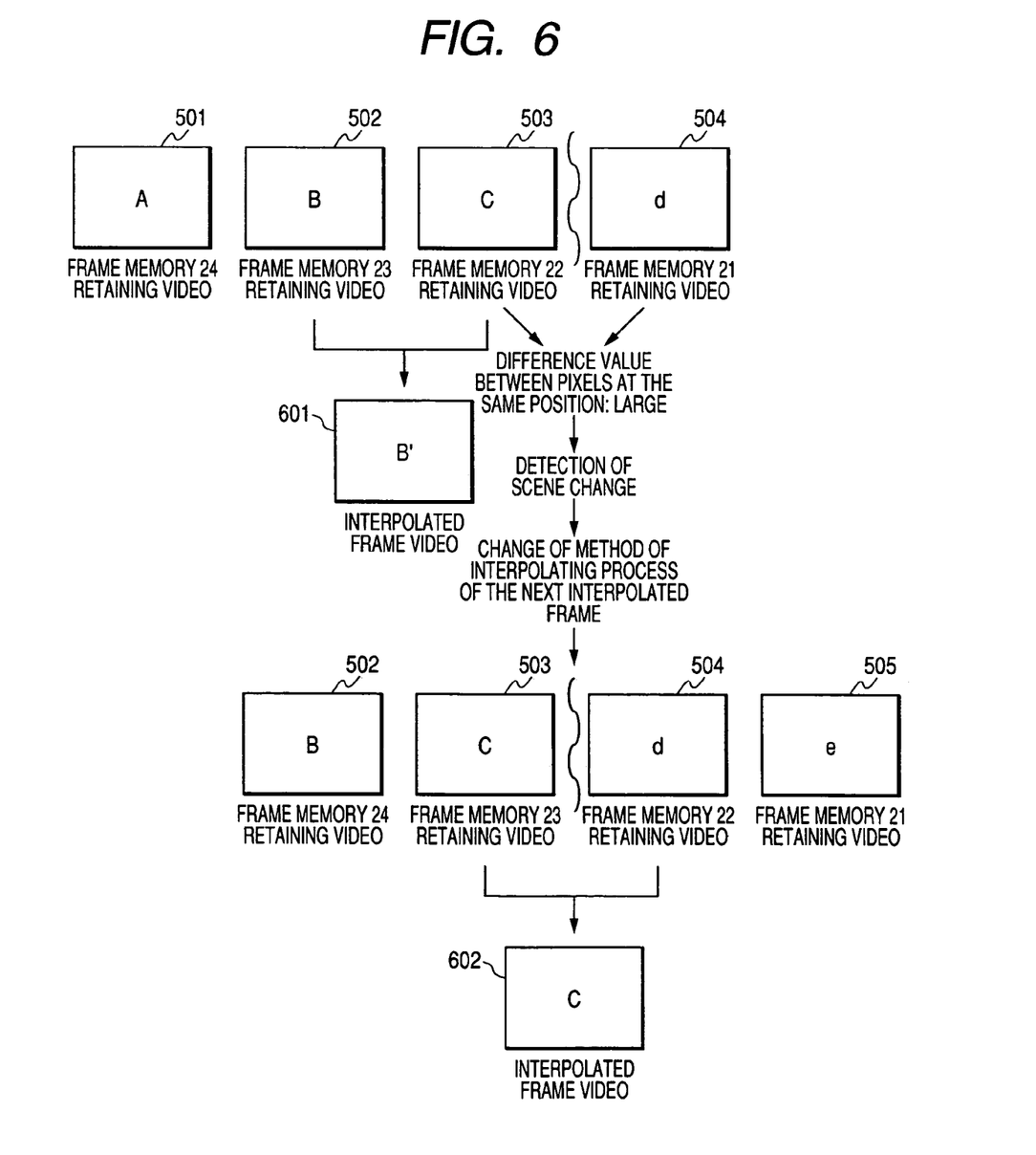
FIG. 6 is a drawing showing a process when a scene change is occurred in the second embodiment.

The correlation detection/interpolated pixel generation unit 12 uses the signal from the frame memories 21, 22 for detecting the scene change in addition to the processing described above. As shown in FIG. 6, it is assumed that the image 501 is retained in the frame memory 24, the image 502 is retained in the frame memory 23, the image 503 is retained in the frame memory 22, and the image 504 is retained in the frame memory 21 at a certain moment. At this time, it is assumed that the images 501-503 are the same scene, and are A, B, C which have small differences from each other. On the other hand, the image 504 is a different scene, and is an image d which is significantly different from A to C. In this state, the correlation detection/interpolated pixel generation unit 12 calculates the difference between the signal from the frame memory 21 and the signal from the frame memory 22. This difference is the difference between the same positions (the pixels at the same coordinate) between these frames. This calculation is performed for all the pixels in one frame, or for all the pixels in the preset area (for example, 80% of the entire display, which is preset on the basis of the center of the screen). Then, the difference between the respective pixels in one frame is accumulated, and when the accumulated value exceeds the predetermine value, it is determined that the scene change has occurred. Information on the scene change is retained in the correlation detection/interpolated pixel generation unit 12. When the time is elapsed, the image 502 is retained in the frame memory 24, the image 503 is retained in the frame memory 23, the image 504 is retained in the frame memory 22, and the image 505 is retained in the frame memory 21. At this time, since information on scene change is retained in the correlation detection/interpolated pixel generation unit 12, the direction of interpolation is changed using this information. In other words, in this embodiment, information on the detected scene change is not reflected to the interpolation process at the time point of detection, but reflected to the subsequent interpolating process. The method of interpolation is changed in the following manner. In other words, before scene change, the direction of interpolation is detected and interpolated from data of four frames as in the first embodiment, while after scene change, such detection of the direction of interpolation is not performed and the interpolated pixel is generated from the weighted mean between the images 503 and 504. At this time, it is also possible to perform the interpolation processing using data of the image 503 or 504 as is. In the above-described description, accumulation of differences between the pixels for one frame is used for detecting the scene change. However, it is also possible to integrate the number of pixels whereof the value of difference is at least a predetermined constant value over one frame, and determine that the scene change has occurred when the integrated value is equal to or larger than a predetermined value.

The frame memory 25 stores the image of the interpolated frame generated in the manner described above and outputs the same to the switching circuit 31. The switching circuit 31 switches the interpolated frame from the frame memory 25 and the previous frame 113 from the frame memory 23 periodically, and outputs the image signal of 60 frames per second. At this time, the selected time for the interpolated frame and the selected time for the previous frame in the switching circuit 31 are not the same. In other words, as shown in "OUTPUT SIGNAL" in FIG. 4, the switching circuit selects the signal from the frame memory 23 when outputting the images 401, 406, 411, and selects the signal from the frame memory 25 when outputting the images 402-405 and the images 407-410. In other words, the switching circuit 31 selects the signal from the frame memory 23 at the timing where the images 301, 321 and 341 are generated in the sequential scanning conversion unit and selects the signal from the frame memory 25 at other timings.

In this embodiment, the actions of the frame memory 25 and the switching circuit 31 are described by exemplifying a process for the image of 60 frames per second. Even when the output frame frequency of the image is changed, the same processing is performed other than a point that the operation speed and/or the order of the frame memories to be read out are changed.

A voice delay unit 71 has a function to delay a voice signal which is inputted together with the image signal. In the aforementioned frame rate conversion process, the image delays since it uses the field memory and the frame memory, while there occurs no delay in voice. Therefore, there occurs a time lag between the image and the voice. The voice delay unit 71 is intended for compensating this time lag. The voice delay unit 71 processes the voice in digital form, and compensates the time lag between the image and the voice by providing a delay as much as the image to the voice by, for example, FIFO.

As described above, the invention is applied to the image device for performing the frame rate conversion process (image signal output devices such as a DVD player or a set-top box, or image display apparatus such as a television receiving set). In particular, it is effective when smoothening of the movement of the image after the frame rate conversion is desired.

What is claimed is:

1. A moving image device performing a frame rate conversion, the device comprising:
   a signal input terminal to which an image signal is inputted; and
   a frame rate conversion unit for generating an interpolated frame using the image signal inputted to the signal input terminal and converting the frame rate of the image signal by inserting the interpolated frame into the image signal, wherein:
   the frame rate conversion unit generates the interpolated frame using a motion vector of the image on four frames, the four frames including a first frame which appeared, with respect to the timing when the interpolated frame is inserted, before the insertion time of the interpolated frame, a second frame appeared before the first frame, a third frame appeared after the insertion time, and a fourth frame appeared after the third frame, and
   the frame rate conversion unit sets straight lines passing through the first to fourth frames based on a certain interpolated pixel in the interpolated frame, and uses a sum of the difference between the pixel on the first frame and the pixel on the second frame located on the straight line, the difference between the pixel on the first frame and the pixel on the third frame located on the straight line, and the difference between the pixel on the third frame and the pixel on the fourth frame located on the straight line as information for generating the interpolated frame.

2. A moving image device performing a frame rate conversion, the device comprising:

a signal input terminal to which an image signal is inputted; and a frame rate conversion unit for generating an interpolated frame using the image signal inputted to the signal input terminal and converting the frame rate of the image signal by inserting the interpolated frame into the image signal, wherein:

the frame rate conversion unit generates the interpolated frame using a motion vector of the image on four frames, the four frames including a first frame which appeared, with respect to the timing when the interpolated frame is inserted, before the insertion time of the interpolated frame, a second frame appeared before the first frame, a third frame appeared after the insertion time, and a fourth frame appeared after the third frame; and the frame rate conversion unit generates the interpolated frame by setting the plurality of straight lines passing through the first to fourth frames based on the interpolated pixel in the interpolated frame, obtains, for each of the plurality of the straight lines, a sum of the difference between the pixel on the first frame and the pixel on the second frame located on each straight line, the difference between the pixel on the first frame and the pixel on the third frame located on the straight line, and the difference between the pixel on the third frame and the pixel on the fourth frame located on the straight line, and generates the certain interpolated pixel using the pixel information on the first frame and the third frame located on the straight line whereof the sum of the differences is the smallest.

3. A moving image device performing a frame rate conversion, the device comprising:

a signal input terminal to which an image signal is inputted; and a frame rate conversion unit for generating an interpolated frame using the image signal inputted to the signal input terminal and converting the frame rate of the image signal by inserting the interpolated frame into the image signal, wherein the frame rate conversion unit generates the interpolated frame using a motion vector of the image on four frames, the four frames including a first frame which appeared, with respect to the timing when the interpolated frame is inserted, before the insertion time of the interpolated frame, a second frame appeared before the first frame, a third frame appeared after the insertion time, and a fourth frame appeared after the third frame, generates the interpolated frame by setting a plurality of straight lines passing through the first to the fourth frames based on a certain interpolated pixel in the interpolated frame, obtains, for each of the plurality of the straight lines, a sum of the difference between the pixel on the first frame and the pixel on the second frame located on each straight line, the difference between the pixel on the first frame and the pixel on the third frame located on the straight line, the difference between the pixel on the third frame and the pixel on the fourth frame located on the straight line, and uses the straight line whereof the sum of the difference is the smallest as a reference for determining the direction of interpolation and generates the certain interpolated pixel using pixel information of the first frame to the third frame in the determined direction of interpolation.

4. The moving image device according to claim 3, wherein the frame rate conversion unit determines the direction of interpolation of the certain interpolated pixel using the straight line whereof the sum of the differences is the smallest and the direction of interpolation of at least one interpolated pixel generated before the certain interpolated pixel.

5. The moving image device according to claim 3, wherein the frame rate conversion unit determines the direction of interpolation of the certain interpolated pixel using the straight line whereof the sum of the differences is the smallest and one or the plurality of the directions of interpolation in the interpolated frame generated before the interpolated frame.

6. The moving image device according to claim 3, further comprising:

a detecting unit for detecting the scene change of the image signal;

wherein the interpolation process is changed when the detecting unit detected the scene change.

7. The moving image device according to claim 6, wherein a certain interpolated pixel is generated using information on pixels of the first frame and/or the third frame at the same position as the certain interpolated pixel of the interpolated frame when the detection unit detects the scene change.

8. A moving image device performing a frame rate conversion, the device comprising:

a signal input terminal to which an image signal is inputted; and a frame rate conversion unit for generating an interpolated frame using the image signal inputted to the signal input terminal and converting the frame rate of the image signal by inserting the interpolated frame into the image signal, wherein the frame rate conversion unit generates the interpolated frame using a motion vector of the image on four frames, the four frames including a first frame which appeared, with respect to the timing when the interpolated frame is inserted, before the insertion time of the interpolated frame, a second frame appeared before the first frame, a third frame appeared after the insertion time, and a fourth frame appeared after the third frame, the moving image device further comprising:

a first frame memory for delaying the image signal by one frame and generating the third frame;

a second frame memory for delaying an output from the first frame memory by another one frame to generate the first frame;

a third frame memory for delaying the output from the second frame memory by another one frame to generate the second frame;

an interpolated frame generating unit for generating the interpolated frame by using the image signal as the fourth frame and using the third frame outputted from the first frame memory, the first frame outputted from the second frame memory, and the second frame outputted from the third frame memory;

a fourth frame memory for converting the rate of the image outputted from the interpolated frame generating unit; and a switching unit for switching between the output from the fourth frame memory and the output from the second frame memory periodically.

9. The moving image device according to claim 8, wherein the switching unit converts the frame rate of the image signal to double by switching the output from the fourth frame memory and the output from the second or the third frame memory in a cycle twice the frame rate of the image signal.

10. A moving image device performing a frame rate conversion, the device comprising:
   a signal input terminal to which an image signal is inputted; and
   a frame rate conversion unit for generating an interpolated frame using the image signal inputted to the signal input terminal and converting the frame rate of the image signal by inserting the interpolated frame into the image signal,
   wherein the frame rate conversion unit generates the interpolated frame using a motion vector of the image on four frames, the four frames including a first frame which appeared, with respect to the timing when the interpolated frame is inserted, before the insertion time of the interpolated frame, a second frame appeared before the first frame, a third frame appeared after the insertion time, and a fourth frame appeared after the third frame, the moving image device further comprising:
   a first frame memory for delaying the image signal by one frame and generating the fourth frame;
   a second frame memory for delaying the output of the first frame memory by another one frame and generating the third frame;
   a third frame memory for delaying the output of the second frame memory by another one frame and generating the first frame;
   a fourth frame memory for delaying the output of the third frame memory by another one frame and generating the second frame;
   an interpolated frame generating unit for generating the interpolated frame using the first to fourth frames outputted from the first to fourth frame memories;
   a fifth frame memory converting the rate of the image outputted from the interpolated frame generating unit; and
   a switching unit for switching between the output from the fifth frame memory and the output from the third frame memory periodically.

11. The moving image device according to claim 10, further comprising:
   a sequential scanning conversion unit for, when the image signal is an interlace signal, converting the image signal to the sequential scanning mode and supplying the same to the first frame memory.

12. The moving image device according to claim 10, further comprising;
   a sequential scanning conversion unit for, when the 2-3 pulldowned interlace image signal is inputted, converting the image signal to the sequential scanning image signal of 24 frames per second and supplying the same to the first frame memory.

13. The moving image device according to claim 12, wherein the sequential scanning conversion unit determines whether or not the inputted image signal is 2-3 pulldowned signal and, when the inputted image signal is determined to be the 2-3 pulldowned signal, performs the sequential scanning conversion process.

14. A method of converting a frame rate, comprising the steps of:
   obtaining four consecutive frames from an inputted image signal;
   generating an interpolated frame using a motion vector of the image on the obtained four frames;
   inserting the interpolated frame between the second and third frames of the obtained four frames to convert the frame rate of the inputted image signal;
   deciding the direction of interpolation for generating the interpolated frame from the consecutive four frames;
   generating the interpolated frame using information on the pixels of the second and third frames located in the fixed direction of interpolation;
   setting a plurality of straight lines passing through the four consecutive frames on the basis of a certain interpolated pixel in the interpolated frame;
   obtaining, for each of the plurality of the straight lines, a sum of the difference between the pixel on the first frame and the pixel on the second frame located on each straight line, the difference between the pixel on the second frame and the pixel on the third frame, the difference between the pixel on the third frame and the pixel on the fourth frame; and
   fixing the direction of interpolation based on a straight line whereof the sum value is the smallest.

15. The frame rate converting method according to claim 14, further comprising the steps of:
   setting a plurality of straight lines passing through the consecutive four frames on the basis of a certain interpolation pixel in the interpolated frame;
   obtaining a sum value of an absolute value of the difference between the first frame and the second frame, an absolute value of the difference between the second frame and the third frame, and an absolute value of the difference between the third frame and the fourth frame for each of the plurality of the straight lines;
   fixing the direction of interpolation based on the straight line whereof the sum value is the smallest; and
   generating the certain interpolation pixel by an average value between the pixel in the second frame and the pixel in the third frame located in the fixed direction of interpolation.

* * * * *